United States Patent [19]

Becher et al.

[11] Patent Number: 4,609,555
[45] Date of Patent: Sep. 2, 1986

[54] TOPICAL FLAVORING COMPOSITION FOR BAKED PRODUCTS

[75] Inventors: Michael G. Becher, Flower Mound; Victor H. Ke, Grand Prairie, both of Tex.

[73] Assignee: Frito-Lay, Inc., Dallas, Tex.

[21] Appl. No.: 703,985

[22] Filed: Feb. 21, 1985

[51] Int. Cl.⁴ .............................................. A21D 13/00
[52] U.S. Cl. ...................................... 426/94; 426/285; 426/296; 426/102; 426/549; 426/650; 426/653; 426/658
[58] Field of Search ............... 426/549, 653, 658, 650, 426/94, 296, 285, 102

[56] References Cited

U.S. PATENT DOCUMENTS

| | | | |
|---|---|---|---|
| 3,057,730 | 10/1962 | Morck | 426/549 X |
| 3,508,926 | 4/1970 | Werbin et al. | 426/549 X |
| 3,647,480 | 3/1972 | Cermak | 426/653 X |
| 3,671,264 | 6/1972 | Drews et al. | 426/653 X |
| 3,796,814 | 3/1974 | Cermak | 426/98 |
| 3,917,858 | 11/1975 | Bos | 426/594 |
| 4,016,337 | 4/1977 | Hsu | 426/99 |
| 4,112,125 | 9/1978 | Chesnut et al. | 426/250 |
| 4,260,637 | 4/1981 | Rispoli et al. | 426/96 |

OTHER PUBLICATIONS

Matz Bakery Technology & Engineering, 2nd ed., 1972, Avi: Westport, Conn., pp. 237–239.

*Primary Examiner*—Joseph Golian
*Attorney, Agent, or Firm*—Bernard, Rothwell & Brown

[57] ABSTRACT

Flavoring compositions for topical, prebake application to baked dough products are produced by mixing a comminuted baked dough product, a low density oil absorbing starch hydrolysate, and flour to produce a dry ingredient mixture; mixing the dry ingredient mixture with a first melted fat having a Wiley melting point below about 120° F.; mixing water with the dry ingredient mixture and first melted fat; mixing a second melted fat having a Wiley melting point above about 124° F. with the dry ingredient mixture, first melted fat and water; and mixing at least one flavoring agent with the ingredients in one or more or the other steps. The method of the invention produces discrete particles of flavoring composition which can be topically applied to the surface of an unbaked dough such as a cracker preform, and baked to obtain a baked dough product having excellent flavor and texture variety.

28 Claims, No Drawings

TOPICAL FLAVORING COMPOSITION FOR BAKED PRODUCTS

BACKGROUND OF THE INVENTION

1. Field of the Invention

This invention relates to baked products, such as crackers and cookies, having topical flavoring compositions adhered to their surfaces. More particularly, the invention relates to the production of flavoring compositions which can be topically applied to unbaked dough products such as cracker preforms, and subsequently baked together with the preformed dough products to produce an adherent topping which imparts flavor and texture variety to the resultant baked food product.

2. Prior Art

It has been a common practice in the production of baked products, such as crackers or cookies, to apply flavoring compositions topically to the baked products in order to impart flavor and texture variety. Generally the flavor compositions have been applied after the product has been baked using application techniques such as spraying or dipping. An exception to this generalization would be the topical application of a non-heat sensitive mixture to a streusel dough before baking.

Studies of consumer preferences have repeatedly shown that consumers desire flavor and texture variety in food products, particularly baked snack products such as crackers and cookies. Manufacturers of baked goods have sought to achieve flavor and texture variety by the topical application of any number of different flavoring compositions. These compositions often incorporate some type of particulate or crumb-like material to impart textural variety to the product. As an additional advantage, this allows the manufacturer to recycle baked material which would otherwise become waste, such as broken cracker pieces and cracker crumbs. Since many particulate materials are highly susceptible to burning if they are subjected to the baking process, they have normally been applied to the product only after the product has been baked. In order to assure that these materials adhere to the surfaces of the baked products, they are frequently applied in the form of coated particles, usually having an oil-based coating material. Flavoring materials can also be dispersed in the oil. Topical seasoning compositions of this type have not been completely satisfactory for a number of reasons. The particles generally do not adhere tightly to the baked product and may become separated from the product during handling. They may impart an undesirable oiliness to the surface. They may be difficult to apply since the particulate material tends to clog spray nozzles and the oil tends to run off the products. Moreover, it may be difficult to incorporate water-soluble flavoring materials in the oil-based composition. Accordingly, there remains a need in the art for a topical flavoring composition which can conveniently be applied to baked dough products and which adheres tightly to the surface of the baked dough product to impart flavor and texture variety.

SUMMARY OF THE INVENTION

This invention provides a method for producing a flavoring composition for topical, prebake application to a baked dough product. The method comprises mixing a comminuted baked dough product, a low bulk density oil absorbing starch hydrolysate, and flour to produce a dry ingredient mixture; mixing the dry ingredient mixture with a first melted fat having a Wiley melting point below about 120° F.; mixing water with the dry ingredient mixture and first melted fat; mixing a second melted fat having a Wiley melting point above about 124° F. with the dry ingredient mixture, first melted fat and water; and mixing at least one flavoring agent with ingredients in one or more of the mixing steps. The method of the invention produces a flavoring composition in the form of discrete particles which are dry to the touch and can easily be applied to a baked dough product.

The flavoring composition produced in the manner described above can be applied topically to an unbaked dough product such as an unbaked cracker preform and baked together with the cracker preform. Even at baking temperatures as high as 625° F., we have found that the particles of flavoring compsition will not burn. The resulting baked product exhibits texture and flavor variety with excellent flavor release properties. A wide variety of flavoring agents can be incorporated into the baked products of the invention, including solid and liquid flavoring agents, which can be oil soluble or water soluble. The particles of flavoring composition adhere tightly to the surfaces of the baked product.

DETAILED DESCRIPTION OF THE INVENTION

The flavoring compositions of the invention incorporate a comminuted baked dough product. The comminuted baked dough product is generally in the form of a meal produced by grinding a baked dough product. Any baked dough product may be employed, with the particular selection being dependent largely upon the flavor which one desired in the final product. For example, one can use cracker meal or cookie meal. When the flavoring composition is to be applied topically to a cracker preform, I prefer to employ cracker meal in the flavoring composition. The comminuted baked dough product serves as a nucleation site for the formation of particles in the production of the flavoring composition. Accordingly, the comminuted baked dough product should be in the form of particles larger than those found in powders. Preferably, the comminuted baked dough product has a mesh size from about 4 to 40 mesh (U.S. Standard Sieve). A key feature of the invention is the use of a dual-fat system in the flavoring composition. The first fat in the dual-fat system has a relatively low melting point. It should, however, have a melting point which is above the ambient temperatures at which the product is likely to be stored and served so that the particles of flavor composition on the product maintain their solid character and do not become oily as the result of fat melting and exuding out of the flavor particles. The first fat has a Wiley melting point (determined by AOCS Ce2-38, American Oil Chemists Society) below about 120° F., preferably below about 116° F. For reasons previously given, it is preferred that the Wiley melting point of the first fat be not less than about 75° F., more preferably not less than about 90° F. Numerous fats having melting points in this range are known and commercially available. Many commercially available fats conventionally used as shortenings are suitable. These generally consist of partially hydrogenated vegetable oils. The first fat acts as an excellent flavor releasing agent in the flavoring compositions of the invention.

The second fat in the dual-fat system has a relatively higher melting point than the first fat. Preferably, the second fat has a Wiley melting point of at least about 124° F., more preferably at least about 130° F. While there is no strict upper limit on the melting point of the second fat, it is preferred that it not be so high that the melted fat raises the temperature of the mixture unacceptably during preparation of the flavoring composition, as will be discussed below. Preferably, the Wiley melting point of the second fat does not exceed about 150° F., more preferably it does not exceed about 135° F. Fats which have melting points in the ranges set forth above are known and commercially available. A suitable fat for use as the second fat in the flavoring composition is commercially available under the name KLX fat, made by Durkee Corporation, Chicago, Ill. 60647. KLX fat is a mixture of partially hydrogenated cottonseed and soybean oils having a Wiley melting point of 130° F.

While not wishing to be bound by any particular theory or mechanism by which the invention fuctions, it is believed that the second fat acts as a heat sink during baking of the dough product containing the topical flavoring, which contributes significantly to the ability of the particles to resist burning during the baking process. Additionally, the second fat helps the flavoring composition to form larger particles during mixing so that surface texture variety of the baked product containing the topical flavoring composition is maximized.

The flour which is incorporated into the flavoring composition can be any flour which is conventionally used in the production of baked products such as crackers or cookies. While wheat flour is generally preferred, other flours can be employed including, for example, oat, rice, and corn flours. A particularly preferred flour is wheat flour of the type normally used in cracker dough formulations. This flour usually has a protein content of about 10 percent.

The low bulk density oil absorbing starch hydrolysate which is incorporated into the flavoring composition is a medium to long chain starch hydrolysate and has a bluk density between 1 and 20 pounds per cubic foot, preferably between 2 and 10 pounds per cubic foot. These low bulk density oil absorbing starch hydrolysates generally are capable of absorbing up to about 50 percent of their weight of oil. Preferred starch hydrolysates are the dextrins and maltodextrins, with tapioca dextrin being particularly preferred. A suitable tapioca dextrin for use in the practice of the invention is commercially available under the name N-Zorbit starch (National Starch Corp.). This material has a bulk density of about 5 pounds per cubic foot and sbsorbs about 50 precent of its weight in oil and has the ability to bind both water and fat in the flavoring composition, providing a highly desirable texture and allowing both water-soluble and fat-soluble flavoring agents to be incorporated into the composition. I have found that tapioca dextrin is especially highly qualified among low bulk density oil absorbing strach hydrolysates to create the proper type of matrix for achieving the desired texture and flavor release characteristics in the flavoring composition.

The flavoring agents which can be used in the flavoring composition include any of the known flavoring agents used in the food industry, provided they are compatible with the other ingredients of the flavoring composition and do not impart an undesirable texture to the flavoring composition. The flavoring agents may be solid, e.g., granular, powdered, etc., or liquid. They may be fat soluble or water soluble and may impart any desired flavors, including savory and sweet flavors. One can mention as merely illustrative of flavoring agents which can be used in the flavoring composition pepper, salt, cheese powder, onion powder, butter or butter buds, powdered au gratin seasonings, paprika, vanilla extract, orange extract, sweeteners such as sugar and brown sugar, sesame seeds, and ground potato chips.

The relative proportions of the ingredients in the flavoring composition can vary over a fairly wide range, particularly those of the dry ingredient mixture components, i.e., the components mixed prior to the addition of the first melted fat. The proportions of dry ingredient mixture depend to a large extent on the nature of the flavoring agents. For example, if one employs a powdered flavoring agent which is required to be present in fairly large quantity in order to impart the desired flavor, e.g., cheese powder, then the relative amount of other ingredients in the dry ingredient mixture, such as flour or cracker meal, will be reduced. In the case of dry flavoring agents which impart the desired flavor characteristics when present in relatively smaller amounts, e.g., onion powder or butter buds, the relative amounts of other ingredients in the dry ingredient mixture will be increased.

Generally, the comminuted bake dough product is present in the flavoring composition in an amount from 7 weight percent to 17 weight percent, preferably 9 weight percent to 14 weight percent. The low bulk density oil absorbing starch hydrolysate is present in an amount from about 10 weight percent to 20 weight percent, preferably from about 12 weight percent to 14.5 weight percent. The flour is present in an amount from about 5 weight percent to 50 weight percent, preferably from about 8 weight percent to 45 weight percent. The flavoring agent(s) is present in an amount from about 5 weight percent to 50 weight percent, preferably from about 9 weight percent to 47 weight percent. The first fat, i.e., the low melting point fat, is present in an amount from about 7 weight percent to 12 weight percent, preferably from about 9 weight percent to 12 weight percent. The second fat, i.e., the high melting point fat, is present in an amount from about 2 weight percent to 10 weight percent, preferably from about 3 weight percent to 5 weight percent. Water (exclusive of moisture which may be present in the other ingredients of the flavor mixture) is present in an amount from about 4 weight percent to 10 weight percent, preferably from about 6 weight percent to 9 weight percent. All the percentages given are based on the total weight of the flavoring composition. The flavoring composition can be prepared in any suitable vessel equipped with means for thoroughly mixing the ingredients and, preferably, with means for controlling the temperature of the composition as it is being prepared. In preparing the flavoring composition, the dry ingredients, i.e., the comminuted baked dough product, the low bulk density oil absorbing starch hydrolysate, flour and any dry flavoring agents, are charged to the mixing vessel and thoroughly mixed to produce a dry ingredient mixture. The first fat, i.e., the low melting point fat, is heated to its melting point and the melted fat is added to the dry ingredient mixture and mixed until the fat is thoroughly dispersed. The water is then added to the dry ingredient mixture and first fat and mixed until a homogeneous mixture is obtained. Preferably, the water is at normal ambient temperature when it is added to the mixture. The second fat, i.e., the high melting point fat, is heated to its melting point and the melted fat is added to the dry ingredient mixture, first melted fat and water, and mixed until it is thoroughly dispersed. Flavoring agents can be added to the mixture with the other ingredients during any of the other mixing steps, depending on the nature of the flavoring agents. Dry flavoring agents are normally added with the other components of the dry ingredient mixture. Water-soluble flavoring agents can be dissolved in the water prior to its addition to the mixing vessel and fat-soluble flavoring agents can be dissolved in either or both of the melted fats prior to their addition to the mixing vessel.

The specified order of addition of the dry ingredient mixture, the two fats and water in the preparation of the flavoring composition is essential to the obtainment of the proper particle matrix for optimum flavor release and texture. Consequently, after the first fat has been incorporated into the mixture care must be taken not to allow the temperature of the mixture to exceed the melting point of the first fat, lest the matrix structure built up to that point be destroyed. Preferably, the temperature of the mixture is not allowed to exceed about 90° F., more preferably 75° F. This can be achieved by the use of appropriate temperature control means on the mixing vessel and/or by controlling the rate of addition of the second, higher melting fat.

After all the ingredients have been thoroughly dispersed, mixing is continued for a sufficient period to allow the formation of particles having a desired size by agglomeration. The final particle size is largely a matter of choice which depends on the particular end product one desires to produce, that is, the particular surface texture one wishes to have in the final baked product. Preferably, the smallest particles should not be smaller than about U.S. #40 standard mesh size. The final product produced by the process described above will comprise particles having a distribution of particle sizes, which contributes to the pleasing textural variety of the final baked product. The particles of flavoring composition can be sized by any suitable means, such as by passing them through a sieve, in order to remove particles of undesirable size.

The flavoring composition, in the form of particles produced by the above-described method, can be topically applied to a preformed unbaked dough product. As those skilled in the art will be aware, bake products such as crackers, cookies and the like are usually produced by sheeting a mixed dough, (e.g., by calendaring or extrusion), forming the sheeted dough into individual product preforms by cutting the sheeted dough and then baking the preforms. The particles of flavoring compoition of the invention can be applied to one or more surfaces of the unbaked dough, either prior to or after it is cut into preforms, using any conventional means for the application of pariculate topping materials such as a vibrating pan which is suspended above a sheet of dough preforms as they move toward the baking oven on a conveyor belt.

The amount of flavoring composition which is applied to the surfaces of the unbaked dough can vary widely and is largely a matter of choice. I have found that suitable products are produced when the amount of flavoring composition applied is from about 12 weight precent to 30 weight percent of the weight of the unbaked dough. The particulate flavoring composition adheres readily to the surface of the unbaked dough. Unbaked dough preforms having the particles of flavoring composition on their surfaces can be baked in conventional baking ovens without danger that the particles will burn. Typically, baking temperatures will range from about 400° F. to 600° F. During the baking process, the fat system in the flavoring composition becomes partially melted, which causes the particles to become tightly adhered to the surfaces of the baked product after cooling. The flavoring composition of the invention can be topically applied to any conventional baked dough product in order to impart flavor and texture variety. For example, the flavoring composition can be topically applied to crackers, cookies, pastries and other bakery products. It can also be topically applied to fried snack products such as potato chips and tortilla chips, if followed by dry heat treatment to bond the particles to the surface.

The following examples are intended to further illustrate the practice of the invention and are not intended to limit its scope in any way.

EXAMPLE 1

An onion/butter flavoring composition was prepared from the following ingredients:

| Ingredients | Weight (lbs.) |
| --- | --- |
| Salt | 4.5 |
| Cracker Flour | 44.9 |
| Tapioca Dextrin[1] | 14.4 |
| Onion Powder | 1.0 |
| Black Pepper | 0.2 |
| Shortening[2] | 11.9 |
| Water | 7.2 |
| KLX Fat[3] | 4.6 |
| Total | 100.0 |

[1]N—Zorbit starch (National Starch Corp.)
[2]Wiley melting point, 115° F.
[3]Wiler melting point, 130° F.

The salt, cracker meal, cracker flour, tapioca dextrin, butter buds, onion powder and black pepper were charged to a 200 pound mixer and thoroughly mixed for two to three minutes. The shortening, which has been melted, was then added and mixed for two to three minutes. The water was added and mixed for two to three minutes. The KLX fat, which had been melted, was added and mixing continued for a final two to three minutes. Temperature of the mixture was maintained at approximately 700° F. throughout the mixing process. The final product consisted of particles which were compressible and dry to the touch.

This flavoring composition was distributed over a potato cracker preform in the proportion of 23 parts of flavoring composition to 77 parts of potato cracker preform and baked for 3–4 minutes at 380° F. to 650° F.

These were subsequently evaluated by 120 respondents in a Central Location consumer test using a nine point hedonic scale. The mean score for overall acceptability score was 7.4, which falls between a rating of "like moderately" and "like very much."

EXAMPLE 2

A butter/onion flavoring composition was prepared from the following ingredients:

| Ingredients | Weight (lbs.) |
| --- | --- |
| Onion Powder | 1.0 |
| Black Pepper | 0.1 |
| Salt | 4.4 |

-continued

| Ingredients | Weight (lbs.) |
| --- | --- |
| Cracker Meal | 8.2 |
| Cracker Flour | 44.5 |
| Tapioca Dextrin[1] | 14.2 |
| Butter Buds | 4.1 |
| Shortening[2] | 11.8 |
| Water | 7.1 |
| KLX Fat[3] | 4.6 |
| Total | 100.0 |

[1]N—Zorbit starch (National Starch Corp.)
[2]Wiley melting point, 115° F.
[3]Wiley melting point, 130° F.

The onion powder, black pepper, salt, cracker meal, cracker flour, tapioca dextrin and butter buds were charged to a 200 pound mixer and thoroughly mixed for two to three minutes. The shortening, which has been melted, was then added and mixed for two to three minutes. The water was added and mixed for two to three minutes. The KLX fat, which had been melted, was added and mixing continued for a final two to three minutes. Temperature of the mixture was maintained at approximately 70° F. throughout the mixing process. The final product consisted of particles which were compressible and dry to the touch.

This flavoring composition was distributed over a wheat cracker preform in the proportion of 23 parts of flavoring composition to 77 parts of wheat cracker preform and backed for 3–4 minutes at 380° F. to 650° F.

These were subsequently evaluated by 120 respondents in a Central Location consumer test using a nine point hedonic scale. The mean score for overall acceptability score was 7.1, which falls between a rating of "like moderately" and "like very much."

EXAMPLE 3

A cheddar cheese flavoring composition was prepared from the following ingredients:

| Ingredients | Weight (lbs.) |
| --- | --- |
| Cheddar Cheese Powder | 45.0 |
| Salt | 1.2 |
| Tapioca Dextrin[1] | 11.1 |
| Cracker Flour | 8.6 |
| Cracker Meal | 14.7 |
| Shortening[2] | 9.2 |
| Water | 6.9 |
| KLX Fat[3] | 3.2 |
| Total | 99.9 |

[1]N—Zorbit starch (National Starch Corp.)
[2]Wiley melting point, 115° F.
[3]Wiley melting point, 130° F.

The cheddar cheese, salt, tapioca dextrin, cracker meal were charged to a 200 pound mixer and thoroughly mixed for two to three minutes. The shortening, which had been melted, was then added and mixed for two to three minutes. The water was added and mixed for two to three minutes. The KLX fat, which had been melted, was added and mixing continued for a final two to three minutes. Temperature of the mixture was maintained at approximately 70 F. throughout the mixing process. The final product consisted of particles which were conpressible and dry to the touch.

This flavoring composition was distributed over a cheddar cracker preform in the proportion of 23 parts of flavoring composition to 77 parts of cheddar cracker preform and baked for 3–4 minutes at 380° F. to 650° F.

These were subsequently evaluated by 120 respondents in a Central Location consumer test using a nine point hedonic scale. The mean score for overall acceptability score was 7.1, which falls between a rating of "like moderately" and "like very much."

EXAMPLE 4

An au gratin flavoring composition was prepared from the following ingredients:

| Ingredients | Weight (lbs.) |
| --- | --- |
| Au Gratin Seasoning Powder | 42.6 |
| Tapioca Dextrin[1] | 12.3 |
| Cracker Flour | 9.8 |
| Salt | 1.2 |
| Cracker Meal | 16.4 |
| Shortening[2] | 7.0 |
| Water | 6.6 |
| KLX Fat[3] | 4.1 |
| Total | 100.0 |

[1]N—Zorbit starch (National Starch Corp.)
[2]Wiley melting point, 115° F.
[3]Wiley melting point, 130° F.

The au gratin seasoning powder, tapioca dextrin, cracker flour, salt and cracker meal were charged to a 200 pound mixer and thoroughly mixed for two to three minutes. The shortening, which had been melted, was then added and mixed for two to three minutes. The water was added and mixed for two to three minutes. The KLX fat, which had been melted, was added and mixing continued for a final two to three minutes. Temperature of the mixture was maintaned at approximately 70° F. throughout the mixing process. The final product consisted of particles which were compressible and dry to the touch.

This flavoring composition was distributed over a potato cracker preform in the proportion of 23 parts of flavoring composition to 77 parts of potato cracker preform and baked for 3–4 minutes at 380° F.14 650° F.

These were subsequently evaluated by 60 respondents in a Central Location sonsumer test using a nine point hedonic scale. The mean score for overall acceptability was 6.6, which corresponds to a rating of "like moderately."

What is claimed is:

1. A flavoring composition for topical prebake application to a baked dough product in the form of discrete particles produced by the process which comprises mixing from about 7 weight percent to about 17 weight percent of a comminuted, baked dough product, from about 10 weight percent to about 20 weight percent of a low bulk density oil absorbing starch hydrolysate, and from about 5 weight percent to about 50 weight percent flour to produce a dry ingredient mixture; mixing the dry ingredient mixture with from about 7 weight percent to about 12 weight percent of a first melted fat having a Wiley melting point below about 120° F.; mixing from about 4 weight percent to about 10 weight percent water with the dry ingredient mixture and first melted fat; mixing from about 2 weight percent to about 10 weight percent of a second melted fat having a Wiley melting point above about 124° F. with the water, first melted fat and dry ingredient mixture while maintaining the temperature of the first fat below its melting point; and mixing from about 5 weight percent to about 50 weight percent of at least one flavoring agent with the ingredients in one or more of the other mixing steps, the weight percentages being based on total weight of the composition.

2. A flavoring composition as claimed in claim 1, wherein the comminuted baked dough product is present in an amount from about 9 weight percent to 14 weight percent; the low bulk density oil absorbing starch hydrolysate is present in an amount from about 12 weight percent to 14.5 weight percent; the flour is present in an amount from about 8 weight percent to 45 weight percent; the first melted fat is present in an amount from about 9 weight percent to 12 weight percent; the water is present in an amount from about 6 weight percent to 9 weight percent; the second melted fat is present in an amount from about 3 weight percent to 5 weight percent; and the flavoring agent is present in an amount from about 9 weight percent to 47 weight percent; based on the total weight of the flavoring composition.

3. A flavoring composition as claimed in claim 1 wherein the first melted fat has a Wiley melting point below about 116° F. and the second melted fat has a Wiley melting point above about 130° F.

4. A flavoring composition as claimed in claim 1 wherein the comminuted baked dough product has a U.S. Standard mesh size from about 4 to 40.

5. A flavoring composition as claimed in claim 1 wherein the comminuted baked dough product is cracker meal.

6. A flavoring composition as claimed in claim 1 wherein the flavoring agent comprises at least one dry flavoring agent and the flavoring agent is mixed with the comminuted baked dough product, low bulk density oil absorbing starch hydrolysate, and flour to produce the dry ingredient mixture.

7. A flavoring composition as claimed in claim 1, wherein the low bulk density oil absorbing starch has a bulk density between 1 and 20 pounds per cubic foot and is capable of absorbing up to about 50 percent of its weight in oil.

8. A method for producing a flavoring composition for topical prebake application to a backed dough product which comprises mixing from about 7 weight percent to about 17 weight percent of a comminuted, baked dough product, from about 10 weight percent to about 20 weight percent of a low bulk density oil absorbing starch hydrolysate, and from about 5 weight percent to about 50 weight precent flour to produce a dry ingredient mixture, mixing the dry ingredient mixture with from about 7 weight percnet to about 12 weight percent of a first melted fat having a Wiley melting point below about 120° F.; mixing from about 4 weight percent to about 10 weight percent water with the dry ingredient mixture and first melted fat; mixing from about 2 weight percent to about 10 weight percent of a second melted fat having a Wiley melting point above about 124° F. with the water, first melted fat and dry ingredient mixture while maintaining the temperature of the first fat below its melting point; and mixing from about 5 weight percent to about 50 weight percent of at least one flavoring agent with the ingredients in one or more of the other mixing steps, the weight percentages being based on total weight of the composition.

9. A method for producing a flavoring composition as claimed in claim 8, wherein the comminuted baked dough product is added in an amount from about 9 weight percent to 14 weight percent; the low bulk density oil abosrbing starch hydrolysate is added in an amount from about 12 weight percent to 14.5 weight percent; the flour is added in an amount from about 8 weight percent to 45 weight percent; the first melted fat is added in an amount from about 9 weight percent to 12 weight percent; the water is added in an amount from about 6 weight percent to 9 weight percent; the second melted fat is added in an amount from about 3 weight percent to 5 weight percent; and the flavoring agent is added in an amount from about 9 weight percent to 47 weight percent; based on the total weight of the flavoring composition.

10. A method for producing a flavoring composition as claimed in claim 8 wherein the first melted fat has a Wiley melting point below about 116° F. and the second melted fat has a Wiley melting point above about 130° F.

11. A method of producing a flavoring composition as claimed in claim 8 wherein the comminuted baked dough product has a U.S. Standard mesh size from about 4 to 40.

12. A method of producing a flavoring composition as claimed in claim 8, wherein the comminuted baked dough product is cracker meal.

13. A method of producing a flavoring composition as claimed in claim 8 wherein the temperature of the mixture is maintained below the melting point of the first melted fat during the preparation of the flavoring composition.

14. A method of producing a flavoring composition as claimed in claim 8 wherein the flavoring agent comprises at least one dry flavoring agent and the flavoring agent is mixed with the comminuted baked dough product, low bulk density oil absorbing starch hydrolysate, and flour to produce the dry ingredient mixture.

15. A method of producing a baked dough product having flavor and texture variety which comprises:
(a) topically applying to an unbaked dough product a flavoring composition in the form of discrete particles produced by the process which comprises mixing from about 7 weight percent to about 17 weight percent of a comminuted, baked dough product, from about 10 weight percent to about 20 weight percent of a low bulk density oil abosrbing starch hydrolysate, and from about 5 weight percent to about 50 weight percent flour to produce a dry ingredient mixture; mixing the dry ingredient mixture with from about 7 weight percent to about 12 weight percent of a first melted fat having a Wiley melting point below about 120° F.; mixing from about 4 weight percent to about 10 weight percent water with the dry ingredient mixture and first melted fat; mixing from about 2 weight percent to about 10 weight percent of a second melted fat having a Wiley melting point above about 124° F. with the water, first melted fat and dry ingredient mixture while maintaining the temperature of the first fat below its melting point; and mixing from about 5 weight percent to about 50 weight percent of at least one flavoring agent with the ingredients in one or more of the other mixing steps, the weight percentages being based on total weight of the composition.

16. A method of producing a baked dough product as claimed in claim 15 wherein the comminuted baked dough product is present in an amount from about 9 weight percent to 14 weight percent; the low bulk density oil absorbing starch hydrolysate is present in an amount from about 12 weight percent to 14.5 weight percent; the flour is present in an amount from about 8 weight percent to 45 weight percent; the first melted fat is present in an amount from about 9 weight percent to 12 weight percent; the water is present in an amount from about 6 weight percent to 9 weight percent; the second melted fat is present in an amount from about 3 weight percent to 5 weight percent; and the flavoring agent is present in amount from about 9 weight percent to 47 weight percent; based on the total weight of the flavoring composition.

17. A method of producing a baked dough product as claimed in claim 15 wherein the first melted fat has a Wiley melting point below about 116° F. and the second melted fat has a Wiley melting above about 130° F.

18. A method of producing a baked dough product as claimed in claim 15 wherein the comminuted baked dough product has a U.S. Standard mesh size from about 4 to 40.

19. A method for producing a baked dough product as claimed in claim 15 wherein the comminuted baked dough product is cracker meal.

20. A method of producing a baked dough product as claimed in claim 15 wherein the flavoring agent comprises at least one dry flavoring agent and the flavoring agent is mixed with the comminuted baked dough product, the low bulk density oil abosrbing stach hydrolysate, and flour to produce the dry ingredient mixture.

21. A method of producing a baked dough product as claimed in claim 15 wherein the unbaked dough product to which the flavoring composition is applied is cracker dough.

22. A baked dough product produced by the method of claim 15.

23. A baked dough product produced by the method of claim 16.

24. A baked dough product produced by the method of claim 17.

25. A baked dough product produced by the method of claim 18.

26. A baked dough product produced by the method of claim 19.

27. A baked dough product produced by the method of claim 20.

28. A baked dough product produced by the method of claim 21.

* * * * *

UNITED STATES PATENT AND TRADEMARK OFFICE
CERTIFICATE OF CORRECTION

PATENT NO. : 4,609,555

DATED : September 2, 1986

INVENTOR(S) : Becher et al.

It is certified that error appears in the above-identified patent and that said Letters Patent is hereby corrected as shown below:

Col. 4, line 26, "bake" should read -- baked --.

Col. 6, line 47, "700°F." should read -- 70° F. --.

Col. 8, line 41, "sonsumer" should read -- consumer --.

Col. 10, Claim 14, line 2, between "8" and "wherein" insert a comma (-- , --).

Signed and Sealed this

Tenth Day of February, 1987

Attest:

DONALD J. QUIGG

Attesting Officer

Commissioner of Patents and Trademarks